(12) United States Patent
Kasaoki

(10) Patent No.: US 8,625,850 B2
(45) Date of Patent: Jan. 7, 2014

(54) ENVIRONMENT RECOGNITION DEVICE AND ENVIRONMENT RECOGNITION METHOD

(75) Inventor: Seisuke Kasaoki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 13/472,788

(22) Filed: May 16, 2012

(65) Prior Publication Data

US 2012/0294485 A1 Nov. 22, 2012

(30) Foreign Application Priority Data

May 19, 2011 (JP) ................................. 2011-112005

(51) Int. Cl.
*G06K 9/00* (2006.01)

(52) U.S. Cl.
USPC .............. 382/103; 382/104; 382/106; 356/3; 356/11; 348/118; 348/135; 348/148; 348/169

(58) Field of Classification Search
USPC ........................ 382/103, 104, 106; 356/3, 11; 348/118–120, 135–142, 148, 169
See application file for complete search history.

(56) References Cited

U.S. PATENT DOCUMENTS

| 5,530,420 | A * | 6/1996 | Tsuchiya et al. ............... 340/435 |
| 6,088,469 | A * | 7/2000 | Fukumura et al. ............ 382/103 |
| 6,138,062 | A * | 10/2000 | Usami ............................. 701/23 |
| 6,204,754 | B1 * | 3/2001 | Berstis ........................... 340/435 |
| 6,370,261 | B1 * | 4/2002 | Hanawa ......................... 382/104 |
| 6,453,055 | B1 * | 9/2002 | Fukumura et al. ............. 382/103 |
| 6,888,953 | B2 * | 5/2005 | Hanawa ......................... 382/104 |
| 7,266,220 | B2 * | 9/2007 | Sato et al. ...................... 382/104 |
| 7,640,107 | B2 * | 12/2009 | Shimizu et al. ................ 701/523 |
| 2003/0099377 | A1 * | 5/2003 | Hanawa ......................... 382/104 |
| 2003/0210807 | A1 * | 11/2003 | Sato et al. ...................... 382/104 |
| 2005/0099821 | A1 * | 5/2005 | Potter et al. .................... 362/548 |
| 2008/0266396 | A1 * | 10/2008 | Stein .............................. 348/148 |
| 2012/0106786 | A1 * | 5/2012 | Shiraishi et al. .............. 382/103 |
| 2012/0294485 | A1 * | 11/2012 | Kasaoki ......................... 382/103 |

FOREIGN PATENT DOCUMENTS

JP 2008-59323 A 3/2008

* cited by examiner

*Primary Examiner* — Aaron W Carter
(74) *Attorney, Agent, or Firm* — McDermott Will & Emery LLP

(57) ABSTRACT

There are provided an environment recognition device and an environment recognition method. The device obtains position information of a target portion in a detection area, including a relative distance from a subject vehicle; groups continuous target portions into a target object of which position differences in a width direction vertical to an advancing direction of the vehicle and in a depth direction parallel to the advancing direction fall within a first distance; determines that the target object is a candidate of a wall, when the target portions forming the target object forms a tilt surface tilting at a predetermined angle or more with respect to a plane vertical to the advancing direction; and determines that the continuous wall candidates of which position differences in the width and depth directions among the wall candidates fall within a second predetermined distance longer than the first predetermined distance are a wall.

11 Claims, 14 Drawing Sheets

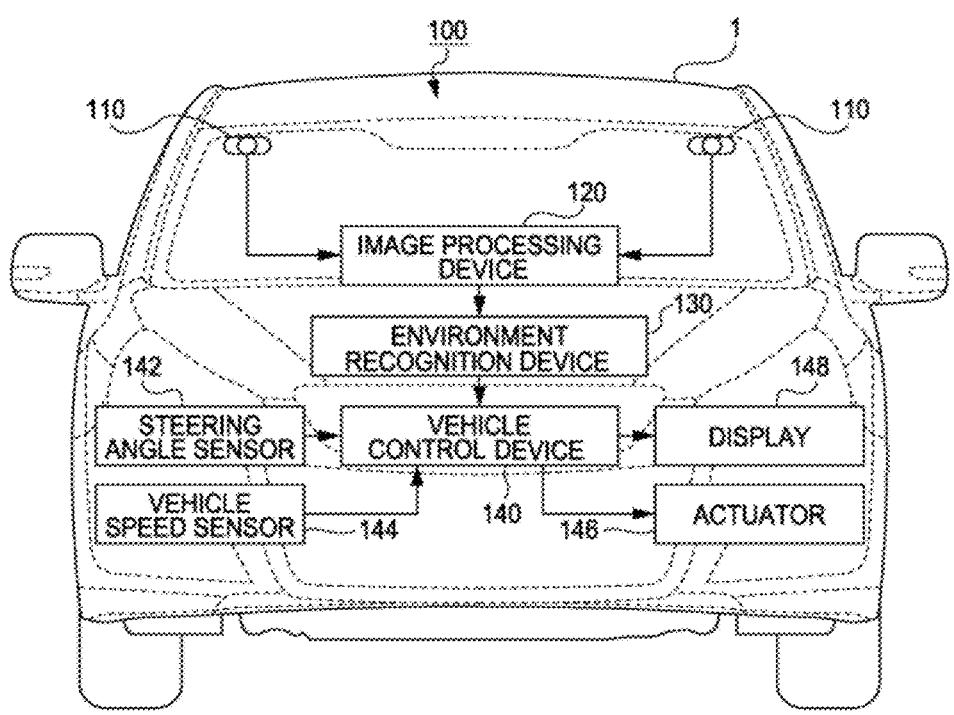

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-112005 filed on May 19, 2011, the entire contents of which are hereby incorporated by reference.

BACKGROUND OF THE INVENTION

1. Field of the Invention

The present invention relates to an environment recognition device and an environment recognition method for recognizing a target object based on luminances of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle.

In this technique, stereo matching processing is performed an image of an environment ahead of a vehicle captured by two cameras, for example, in order to derive parallax for each block including a predetermined number of pixels. Based on this parallax, a position of the vehicle in thereat world is derived.

There is also a technique that performs more advanced control. Specifically, it not only specifies a target object uniformly as a solid object, but further determines whether the detected target object is a preceding vehicle that is running at the same speed as the subject vehicle or a fixed object that does not move. For example, there has been proposed a technique in which a point detected as being tilted at a predetermined angle with respect to the advancing direction of the subject vehicle is determined as a wall such as a guard rail, while a point detected along the horizontal direction of a plane vertical to the advancing direction of the subject vehicle is determined as a back surface of a preceding vehicle (for example, Japanese Patent. Application Laid-Open (JP-A) No. 2008-59323).

However, for example, when light of a tail lamp is diffused at night or in rainy weather, a block that does not indicate the tail lamp might erroneously be matched with a block indicating the tail lamp in the stereo matching process. In this case, the position of the tail lamp, which is derived from the mismatching, in the real world is recognized as being tilted at a predetermined angle with respect to the advancing direction of the subject vehicle. By virtue of this, the portion that are supposed be determined to be the back surface of the preceding vehicle might be determined to be a wall in the technique described in JP-A No. 2008-59323. When an object determined to be a wall is detected in the advancing direction, automatic control for performing an avoiding operation, which is originally unnecessary, might be executed.

BRIEF SUMMARY OF THE INVENTION

The present invention is accomplished in view of the circumstance described above, and aims to provide an environment recognition device and an environment recognition method that are capable of preventing an object that is not a wall from being erroneously determined to be a wall in an environment where light is easily diffused, such as at night or in rainy weather.

In order to solve the above problems, an aspect of the present invention provides an environment recognition device that includes: a position information obtaining unit that obtains position information of a target portion in a detection area of a luminance image, including a relative distance from a subject vehicle; a grouping unit that groups target portions, of which positions differences in a vertical direction and a parallel direction with respect to a base line which corresponds to advancing direction of the subject vehicle fall within a first distance, into a target object; a candidate determining unit that determines that the target object is a candidate of a wall, when the target portions included in the target object form a tilt surface tilting at a predetermined angle or more against a vertical plane with respect to a base plane which corresponds to the advancing direction of the subject vehicle; and a wall determining unit that determines that the wall candidates, of which positions differences in the vertical direction and the parallel direction with respect to a base line which corresponds to the advancing direction of the subject vehicle fall within a second predetermined distance longer than the first predetermined distance, are a wall.

The grouping unit may make a determination for the grouping based on not only the position differences in the vertical direction and the parallel direction with respect to a base line which corresponds to the advancing direction of the subject vehicle but also a position difference in the height direction from a road surface, and the wall determining unit may make a determination of a wall based on not only the position differences in the vertical direction and in the parallel direction with respect to a base line which corresponds to the is advancing direction of the vehicle but also the position difference in the height direction from the road surface.

The environment recognition device may further include an environment determining unit that determines whether or not the detection area is in an environment where light is diffused. The wall determining unit may determine all of the wall candidates as a wall when the environment determining unit determines that the detection area is in the environment where light is not diffused.

The environment recognition device may further include a distance deriving unit that derives each average of in-line relative distances, which are assigned to target portions included in a target obi act and which are aligned in a horizontal direction of the image corresponding to the width direction in the real world; and a group dividing unit that divides the target object at a position where differences of the averages in the vertical direction of the image corresponding to the height direction in the real world exceeds the predetermined threshold value, and defines the position comprised of the horizontally aligned target portions as a boundary of the divided target objects.

The group dividing unit may determine the predetermined threshold value based on the average of the relative distances of all target portions included in the target object.

In order to solve the above problems, another aspect of the present invention provides an environment recognition method that includes: obtaining position information of a target portion in a detection area of a luminance image including a relative distance from a subject vehicle;

grouping target portions, of which positions differences in a vertical direction and a parallel direction with respect to a base line which corresponds to advancing direction of the subject vehicle fail within a first predetermined distance, into a target object; determining that the target object is a candidate of a wall, when the target portions included in the target object form a tilt surface tilting at a predetermined angle or more against a vertical plane with respect to a base plane which corresponds to the advancing direction of the subject vehicle; determining that determines that the wall candidates, of which positions differences in the vertical direction and the parallel direction with respect to a base line which corresponds to the advancing direction of the subject vehicle fall within a second predetermined distance longer than the first predetermined distance, are a wall.

BRIEF DESCRIPTION OF THE SEVERAL VIEWS OF THE DRAWINGS

FIG. 1 is a block diagram illustrating a connection relationship in an environment recognition system;

DETAILED DESCRIPTION OF THE INVENTION

Figure 2A:
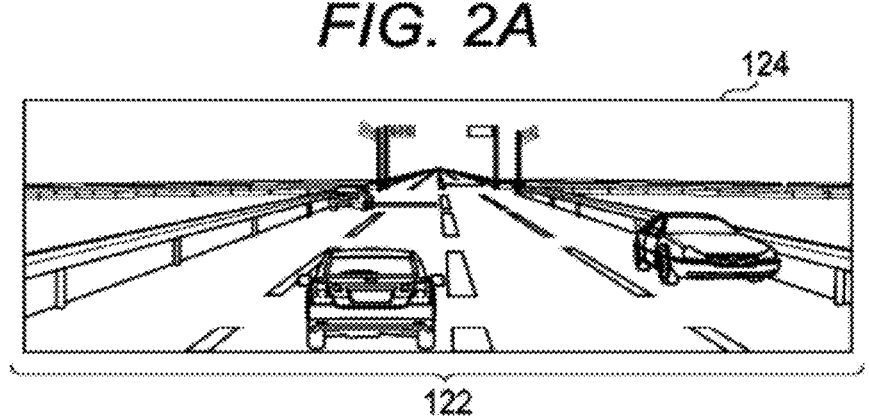
FIGS. 2A, and 2B are explanatory diagrams for explaining a luminance image and a distance image.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related, to the present invention are omitted in the drawings.

(Environment Recognition System 100)

FIG. 1 is, a block diagram illustrating connection relationship in an environment recognition system 100. The environment recognition system 100 includes a plurality of image capturing devices 110 (two image capturing devices 110 in the present embodiment), an image processing device 120, an environment recognition device 130, and a vehicle control device 140 that are provided in a subject vehicle 1.

The image capturing devices 110 include an imaging element such as a CCD (Charge-Coupled Device) and a CMOS (Complementary Metal-Oxide Semiconductor), and can obtain a color image, that is, luminances of three color phases (red, green, blue) per pixel. In the present embodiment, color and luminance are dealt in the same way; if both wordings are included in one sentence, both can be read as luminance configuring color, or color having luminances. In this case, a color image captured by the image capturing devices 110 is referred to as luminance image and is distinguished from a distance image to be explained later. The image capturing devices 110 are disposed to be spaced apart from each other in a substantially horizontal direction so that optical axes of the two image capturing devices 110 are substantially parallel in a proceeding direction of the vehicle 1. The image capturing devices 110 continuously generates image data obtained by capturing an image of a target object existing in a detection area in front of the vehicle 1 at every $\frac{1}{60}$ seconds (60 fps) for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data.

The image processing device 120 obtains image data from each of the two image capturing devices 110, and derives, based on the two pieces of image data, parallax information including a parallax of any block (a set of a predetermined number of pixels) in the image and a position representing a position of the any block in the image. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction. In this embodiment, the horizontal direction means a horizontal direction for the captured image, and corresponds to the width direction in the real world. On the other hand, the vertical direction means a vertical direction for the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived by the target object, but is independently derived by the resolution (for example, by the block) in the detection area In this embodiment, an image obtained by associating the parallax information thus derived (corresponding to a later-described relative distance) with image data is referred to as a distance image.

Figure 2B:
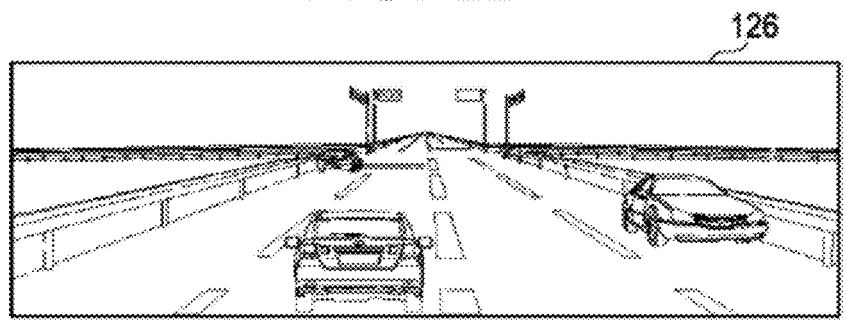

FIGS. 2A and 2B are explanatory diagrams for explaining a luminance image 124 and a distance image 126. For example, Assume that the luminance image (image data) 124 as shown in FIG. 2A is generated regard to a detection area 122 by the two image capturing devices 110. Here, for the sake of easy understanding, only one of the two luminance images 124 is schematically shown. The image processing device 120 obtains a parallax for each block from such luminance image 124, and forms the distance image 126 as shown in FIG. 2B. Each block of the distance image 126 is associated with a parallax of the block. In the drawing, for the sake of explanation, a block from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 uses a so-called stereo method to convert the parallax information for each block in the detection area 122 (distance image 126) derived by the image processing device 120 into three-dimensional position information including a relative distance, thereby deriving heights. The stereo method is a method using a triangulation method to derive a relative distance of a target object with respect to the image capturing device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the subject vehicle 1 based on, for example, a steering angle sensor 142 for detecting an angle of the steering and a vehicle speed sensor 144 for detecting a speed of the subject vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the subject vehicle 1. The vehicle control device 140 can also be integrally implemented with the environment recognition device 130.

(Environment Recognition Device 130)

Figure 3:
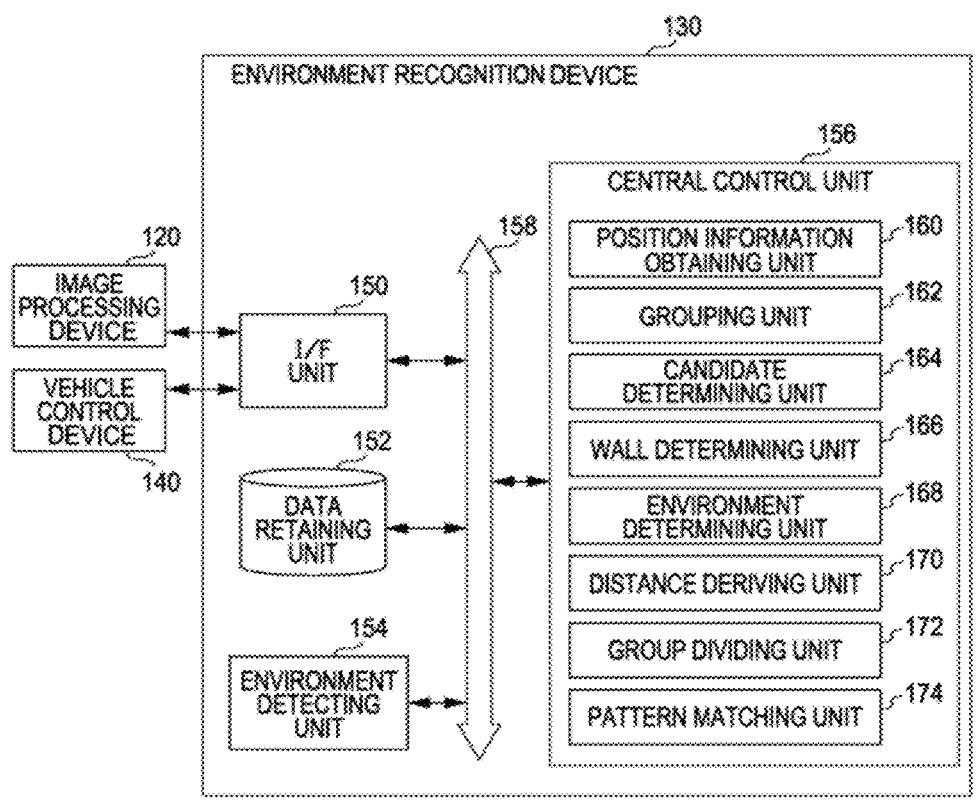
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, an environment detecting unit 154, and a central control unit 156.

The I/F unit 150 is an interface for interactive information exchange with she image processing device 120 and the vehicle control device 140. The data retaining unit 152 is constituted by a RAM, a flash memory, an HDD and the like, and retains various kinds of information required for processing performed by each functional unit explained below. In addition, the data retaining unit 152 temporarily retains the luminance image 124 and the distance image 126 received from the image processing device 120.

The environment detecting unit 154 includes, for example, a night detecting unit that detects nighttime and a rain detecting unit that detects rainfall. When detecting nighttime or rainfall, the environment detecting unit 154 outputs to an environment determining unit 168 described below detection information indicating the detection of nighttime or rainfall. The environment detecting unit 154 may detect not only nighttime and rainfall but also an environment where light from a light source in the captured image is diffused, for example, an environment where the image capturing device 110 captures a backlit image. The night detecting unit may detect nighttime when detecting a lighting of a night lamp of the subject vehicle 1, for example. The night detecting unit and the rain detecting unit can be realized by any existing techniques. Therefore, the detailed description such as its configuration will be omitted here.

The central control unit 156 is comprised of a semiconductor integrated circuit including, for example, a central processing unit (CPU), a ROM storing a program and the like, and a RAM serving as a work area, and controls the I/F unit 150, the data retaining unit 152 and the environment detecting unit 154 through a system bus 158. In the present embodiment, the central control unit 156 also functions as a luminance obtaining unit 160, a position information obtaining unit 162, a candidate determining unit 164, a wall determining unit 166, an environment determining unit 168, a distance deriving unit 170, a group dividing unit 172 and a pattern matching unit 174.

The position information obtaining unit 160 uses the stereo method to convert parallax information, derived by the image processing apparatus 120, for each block in the detection area 122 of the distance image 126 into three-dimensional position information including the width direction x, the height direction y, and the depth direction z. Here, the target portion is supposed to composed of a pixel or a block formed by collecting pixels. In the present embodiment, the target portion has a size equal to the size of the block used in the image processing device 120.

The parallax information derived by the image processing device 120 represents a parallax of each target portion in the distance image 126, whereas the three-dimensional position information represents information about the relative distance of each target portion in the real world. Accordingly, a term such as the relative distance and the height refers to a distance in the real world, whereas a term such as a detected distance refers to a distance in the distance image 126.

Figure 4:
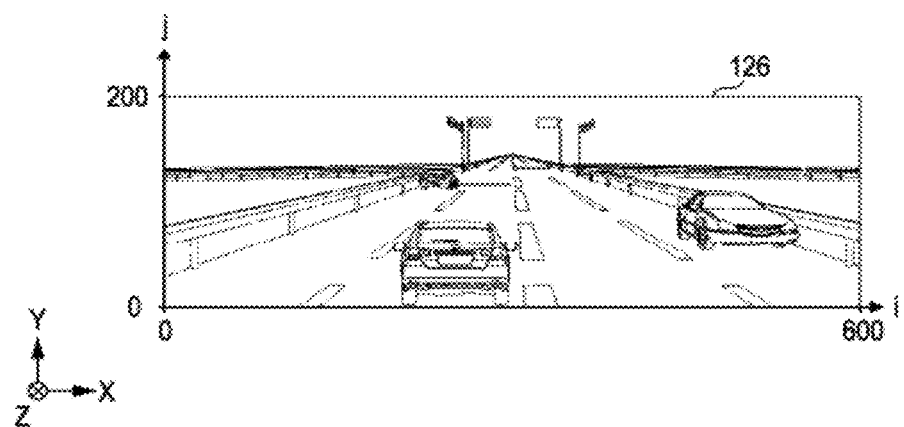
FIG. 4 is an explanatory diagram for explaining conversion into three-dimensional position information is performed by a position information obtaining unit.

FIG. 4 is an explanatory diagram for explaining conversion into three-dimensional position information by the position information obtaining unit 160. First, the position information obtaining unit 160 treats the distance image 126 as a coordinate system in a pixel unit as shown in FIG. 4. In FIG. 4, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i, j and the parallax dp.

The three-dimensional coordinate system in the real world according to the present embodiment will be considered using a relative coordinate system in which the vehicle 1 is located in the center. The right side of the direction in which the subject vehicle 1 moves is denoted as a positive direction of X axis, the upper side of the subject vehicle 1 is denoted as a positive direction of Y axis, the direction in which the subject vehicle 1 moves (front side) is denoted as a positive direction of Z axis, and the crossing point between the road surface and a vertical line passing through the center of two image capturing devices 110 is denoted as an origin (0, 0, 0). When the road is assumed to be a flat plane, the road surface matches the X-Z plane (y=0). The position information obtaining unit 162 uses (formula 1) to (formula 3) shown below to transform the coordinate of the pixel (i, j, dp) in the distance image 126 into a three-dimensional point (x, y, z) in the real world.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the image capturing devices 110, PW denotes a corresponding distance in the real world to a distance between adjacent pixels in the image, so-called like an angle of view per pixel, CH denotes an disposed height of the image capturing device 120 from the road surface, Iv and JV denote coordinates (pixels) in the image at an infinity point in front of the subject vehicle 1, and KS denotes a distance coefficient (KS=CD/PW).

The grouping unit 162 groups continuous target portions of which position differences in a width direction x vertical, to the advancing direction of the subject vehicle 1 and in a depth direction z parallel to the advancing direction of the subject vehicle 1 fall within a first predetermined distance, thereby forming a target group. Specifically, the grouping unit 162 derives the position in the real world of any given target portion and adopts it as a base point. Then the grouping unit 162 groups target portions of which position differences in the width direction x and in the depth direction z from the target portion serving as the base point fall within the first predetermined distance into a target object. The first predetermined distance is represented by a distance in the real world, and can be set as any given value (for example, 1.0 m). The continuous target portions are target portions located on a same curve that is one-order or multiple-order curve.

The grouping unit 162 also adopts the target portion newly added through the grouping processing as a base point and groups the relevant target portions which are provisionally determined to correspond to a same specific object and of which position differences in the width direction x and in the height direction y are within the first predetermined distance. Consequently, as long as the distances between the target portions provisionally determined to be the same specific object is within the first predetermined distance, all of such target portions are grouped.

Figure 5A:
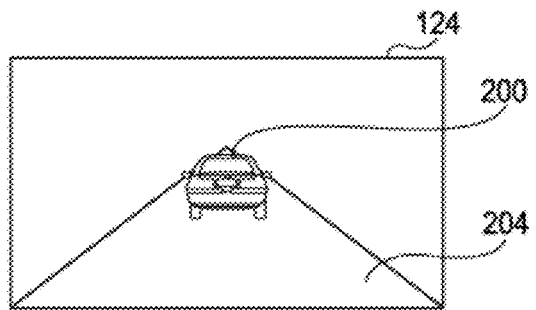
FIGS. 5A to 5D are explanatory diagrams for explaining processing of a grouping unit.
Figure 5B:
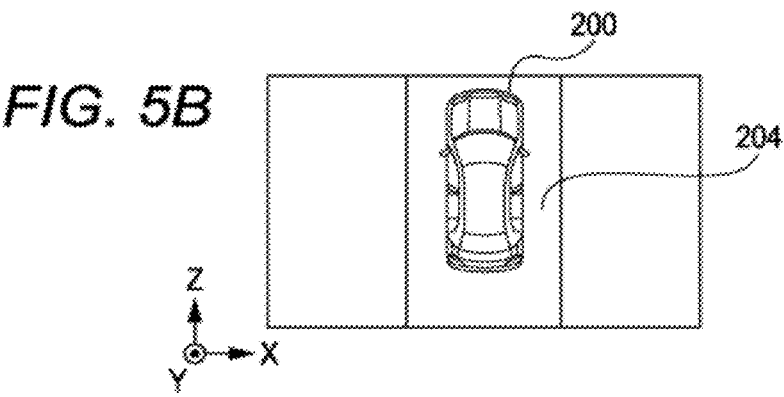
Figure 5C:
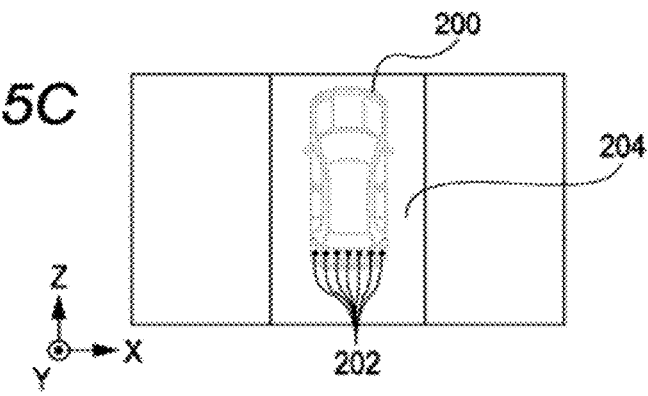
Figure 5D:
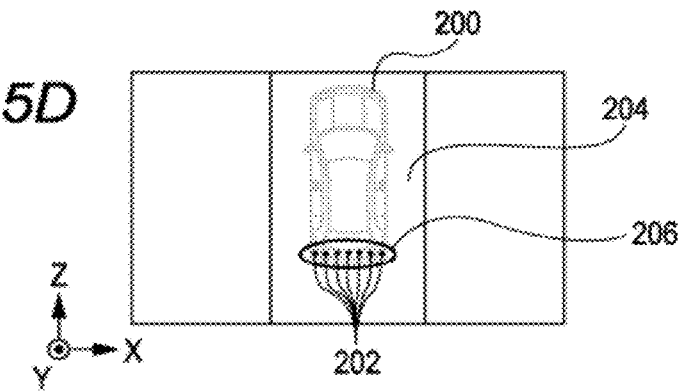

FIGS. 5A and 5B are explanatory diagrams for explaining grouping of target portions 202 of a preceding vehicle 200. It is assumed that the luminance image 124 illustrated in FIG. 5A is generated. FIGS. 5B, 5C, and 5D are plan views when the preceding vehicle 200 on a driving lane 204 in the luminance image 124 is viewed from above in the vertical direction.

When the target portions 202 at the back of the preceding vehicle 200 in FIG. 5B are detected as illustrated in FIG. 5C, the grouping unit 162 groups the target portions 202 so as to form a target object 206 as illustrated in FIG. 5D.

The target portions 202 at the back of the preceding vehicle 200 are detected such that they are almost parallel to the X-axis direction. On the other hand, target portions of a wall such as a guard rail forms a tilt surface that is tilted at a predetermined angle (for example, 45 degrees) or more with respect to the X-axis direction. Therefore, one way of detecting a wall is to search a target object composed of target portion that form a tilt surface tilting at the predetermined angle or more with respect to the X-axis direction. However, this might cause an erroneous detection of a wall at night or in rainy weather.

Figure 6:
FIG. 6 is an explanatory diagram for explaining one example of a luminance image at night.

FIG. 6 is an explanatory diagram for explaining one example of the luminance image 124 at night. As illustrated in FIG. 6, a tail lamp 208 is lighted at the back of the preceding vehicle 200. However, the light from the tail lamp 208 is diffused and dimmed due to the nighttime. In this case, an error might be caused on the parallax information derived by the image processing device 120.

Figure 7A:
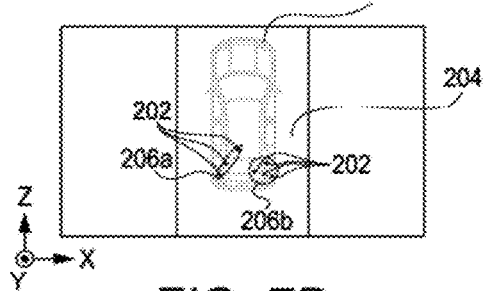
FIGS. 7A to 7D are explanatory diagrams for explaining wall determining processing.

FIGS. 7A to 7F are explanatory diagrams for explaining wall determining processing. FIG. 7A illustrates the case where the target portions 202 at the back of the preceding vehicle 200 are detected as in FIG. 5C, but an error is caused on the parallax information due to nighttime.

When the error is caused on the parallax information as illustrated in FIG. 7A due to the nighttime, the target portions 202 that are supposed to be detected as parallel to the X-axis direction might be detected such that they form a tilt surface tilting at the predetermined angle or more with respect to the direction. Therefore, a target portion 206a formed by grouping the target portions 202 might erroneously be detected as a wall.

In the present embodiment, the candidate determining unit 164, the wall determining unit 166, and the environment determining unit 168 function for avoiding an erroneous detection of a wall. The wall determining processing by the candidate determining unit 164, the wall determining unit 166, and the environment determining unit 168 will be described below in detail.

(Wall Determining Processing)

The candidate determining unit 164 determines whether or not the target portions 202 which are grouped as a target object 206 at a position in the height direction y of 0 or more (located above a road surface) form a tilt surface tilting at the predetermined angle or more with respect to a plane vertical to the advancing direction of the subject vehicle 1. Specifically, the candidate determining unit 164 determines whether or not the target portions 202 form a tilt surface tilting at the predetermined angle or more with respect to the X-axis direction. In the present embodiment, the candidate determining unit 164 makes a determination for a target object that is formed by at least three or more target portions 202 in order to enhance the accuracy of detecting a wall.

When the target portions are located on a tilt surface, the candidate determining unit 164 does not determine that the target object formed by grouping the target portions is a wall only based on this condition, but tentatively determines that they are wall candidates that are candidates for a wall. In FIG. 7A, the target object 206a is determined as a wall candidate.

The wall determining unit 166 determines whether or not there are other wall candidates within a range of a second predetermined distance in the X-axis direction (for example, within AB range illustrated in FIG. 7B, within 5.0 m) and within a second predetermined distance in the Z-axis direction around the central position of the target object 206a. The second predetermined distance is longer than the above-mentioned first predetermined distance.

Figure 7E:
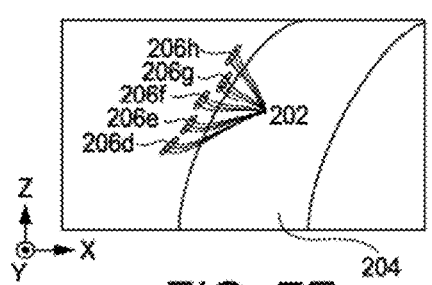
Figure 7B:
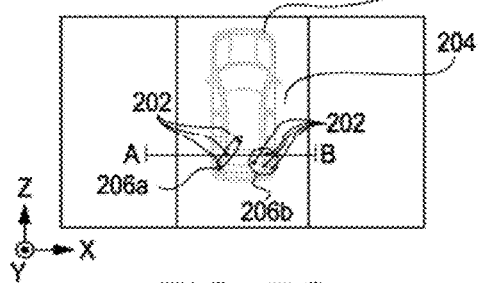

In FIG. 7B, the target objects 206a and 206b are detected from the back of the preceding vehicle 200. Therefore, there is no other wall candidate near the target object 206a. When no other wall candidate is detected, the wall determining unit 166 determines that the wall candidate is not a wall.

In FIG. 7B, if the target object 206b is also determined to be a wall candidate according to its placement, the target object 206a and 206b might be determined as a wall.

A wall such as a guard rail has a tilt surface tilting at a predetermined angle or more with respect to the X-axis direction. Therefore, the target portions of the wall candidates detected from a wall tend to gather on the same tilt surface. On the other hand, when wall candidates are erroneously determined from the hack surface of the preceding vehicle 200, target portions thereof are not likely to be gather on the same tilt surface.

Therefore, if there are other wall candidates located within a predetermined distance from an extended line linking the target portions which grouped into a target object, the wall determining unit 166 determines that these other candidates is a wall. The wall determining unit 166 may employ an approximate curve derived with the positions of the target portions being defined as samples, for example, instead of the line linking the target portions. With this configuration, the wall determining unit 166 can precisely make a determination of a wall.

Figure 7F:
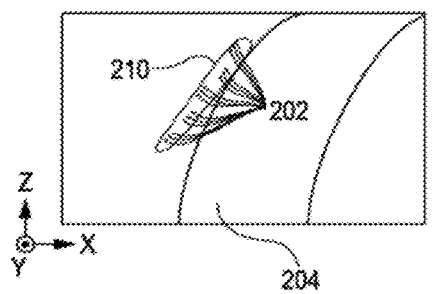
Figure 7C:
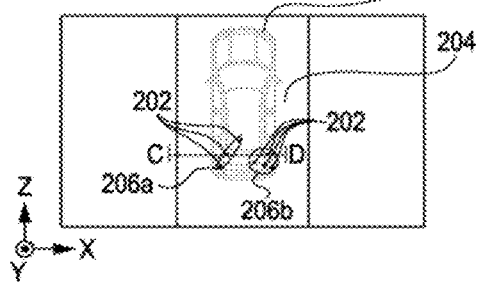
Figure 7D:
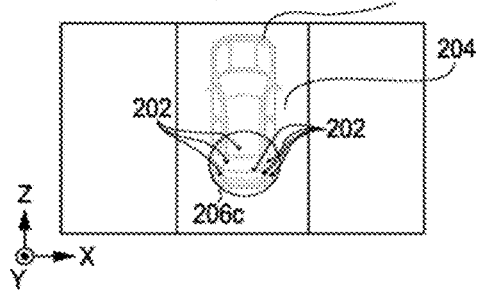

In this case, the wall determining unit 166 defines the wall candidate (target object 206a) that is not determined to be a wall and the target object 206b, which is not the wall candidate and is located within a third predetermined distance (for example, within the range of CD illustrated in FIG. 7C, 3.0 m) from the wall candidate in the X-axis direction and in the Z-axis direction for example, all together as one target object 206c as illustrated in FIG. 7D.

Since a wall candidate that is not determined as a wall is thus grouped with another target object, the later-described pattern matching unit 174 can highly accurately determine that the target object 206c formed by the grouping is the back surface of the vehicle ahead 200, for example.

FIG. 7E illustrates target objects 206d, 206e, 206f, 206g, and 206h detected from a guard rail on a curve. In this case, the wall determining unit 166 detects the target object 206e which is close to the target object 206d within the second predetermined distance in the X-axis direction and in the Z-axis direction around the center of the subject 206d. Similarly, the wall determining unit 166 sequentially detects the target object 206f close to the target object 206e, and the target object 206g close to the target object 206f. In this manner, the target objects 206d to 206h are detected.

As illustrated in FIG. 7F, the wall determining unit 166 determines that these wall candidates which are closely continuous within the second predetermined distance is a wall 210.

A size of a light source such as a tail lamp is smaller than a size of a wall in the direction of the X-Z plane. The wall determining unit 166 in the present embodiment determines continuous wall candidates as a wall, and does not determine a wall candidate that is solely detected as a wall. Therefore, even if the tail lamp is erroneously detected such that it forms a tilt surface like a wall due to the light diffusion, the wall determining unit 166 does not determine the tail lamp as a wall, thereby preventing the erroneous detection of a wall.

The environment determining unit 168 determines whether or not the detection area 122 is in an environment where light is diffused. The environment where light is diffused includes nighttime and an environment where water droplets are deposited onto a front window due to rainfall, or streak is caused by cleaning the water droplets. The environment, determining unit 168 determines that the detection area 122 is in the environment where light is diffused, when the detection information output from the environment detecting unit 154 indicates nighttime or rainfall.

When the environment determining unit 168 determines that the detection area 122 is not in the environment where light is diffused, the wall determining unit 166 determines all wail candidates are a wall. This is because, if the detection area is not in the environment where light is diffused as illustrated in FIG. 6, the possibility of an error caused in the parallax information is low. With this configuration, the wall determining unit 166 can reduce a processing load for the wail determining processing, when the detection area is not in the environment where light is diffused.

(Group Dividing Processing)

The group dividing processing will be described in detail below, in which target objects that are not determined to be a wall and that are erroneously grouped as one target object are divided into separate target objects.

Figure 8A:
FIGS. 8A to 8D are explanatory diagrams for explaining group dividing processing.
Figure 8B:
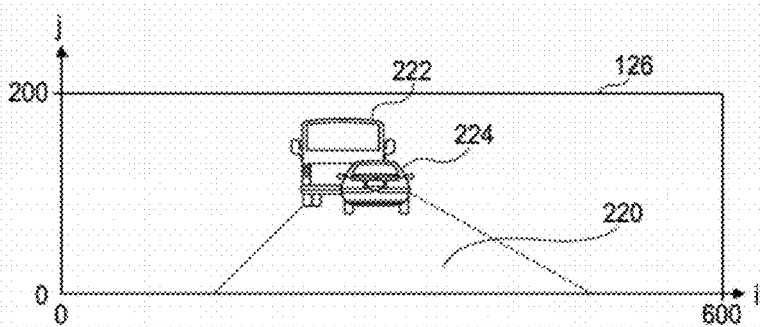
Figure 8C:
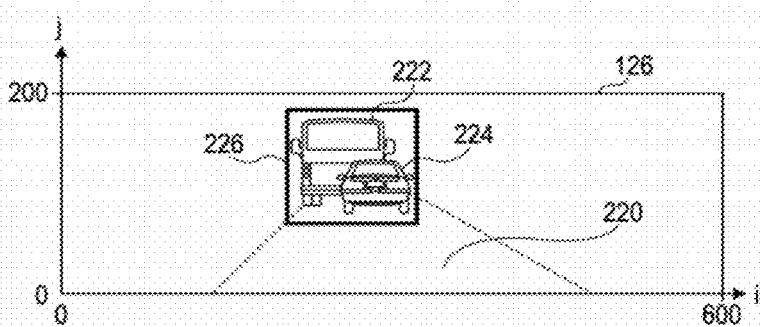

FIGS. 8A to 9C are explanatory diagrams for explaining the group dividing processing. FIG. 8A is an example of the actual luminance image 124, and FIG. 8B is the distance image 126 corresponding to the luminance image 124. The components unnecessary for the description of the group dividing processing are not illustrated in the distance image 126. As illustrated in FIGS. 8A and 8B, it is assumed that a bus 222 and a vehicle 224 run on a driving lane 220, on which the subject vehicle 1 runs, in line in the longitudinal direction to the advancing direction such that they are very close to each other in the depth direction z. In this case, the bus 222 and the vehicle 224 in line might erroneously be detected as one target object 226 as illustrated in FIG. 8C.

Figure 8D:
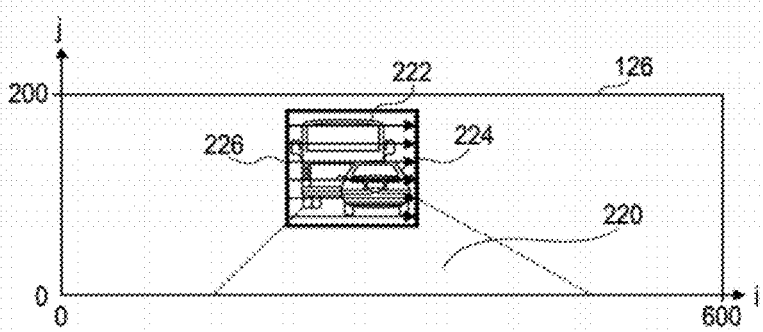

Accordingly, the distance deriving unit 170 derives an average indicated by arrows in FIG. 8D of the relative distances in the depth direction z of target portions of the target object 226 in the distance image 126, the target portions being in the horizontal, direction.

Figure 9A:
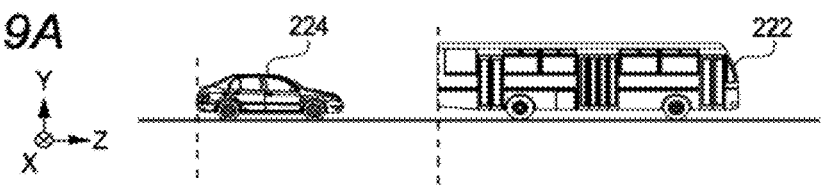
FIGS. 9A to 9C are explanatory diagrams for explaining the group dividing processing.

It is assumed that the bus 222 and the vehicle 224 are in line as illustrated in FIG. 9A, when they are viewed from the X-axis direction. The back surface of the vehicle 224 nearer to the vehicle 1 is entirely displayed, but a part of the back surface of the bus 222 is not displayed onto the luminance image 124, because it is behind the vehicle 224. Therefore, a trajectory of the average of the relative distances in the depth direction z of target portions horizontally in line is plotted on the coordinate system of the j and Z axes on the range image 126 is as illustrated in FIG. 9B, for example.

Figure 9B:
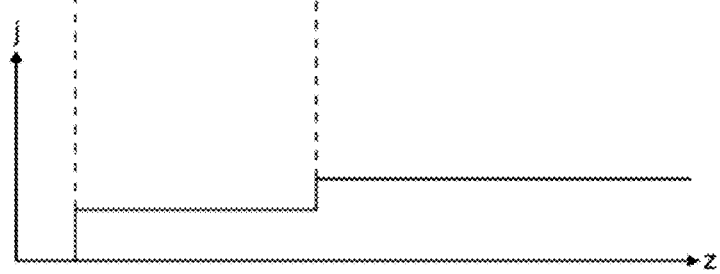
Figure 9C:
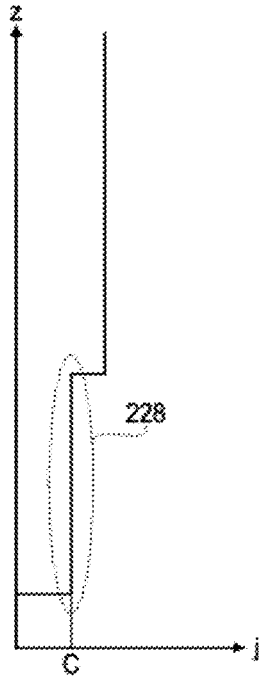

FIG. 9C is a view obtained by rotating the coordinate axes in FIG. 9B by 90 degrees, and inverting the resultant like a mirror image. In FIG. 9C, the relative distance in the depth direction z significantly changes compared to the change in the j coordinate value in a portion indicated by a broken line 228. This portion (hereinafter referred to as vertical position c) corresponds to a boundary portion between the bus 222 and the vehicle 224 on the luminance image 124.

The group dividing unit 172 derives a derivative value of the trajectory of a data column of the average of the relative distances in the depth direction z, disposed based on the j coordinate value, and compares the derived derivative value to a predetermined threshold value, thereby specifying the vertical position c of a group of the target portions exceeding the predetermined threshold value.

Figure 10A:
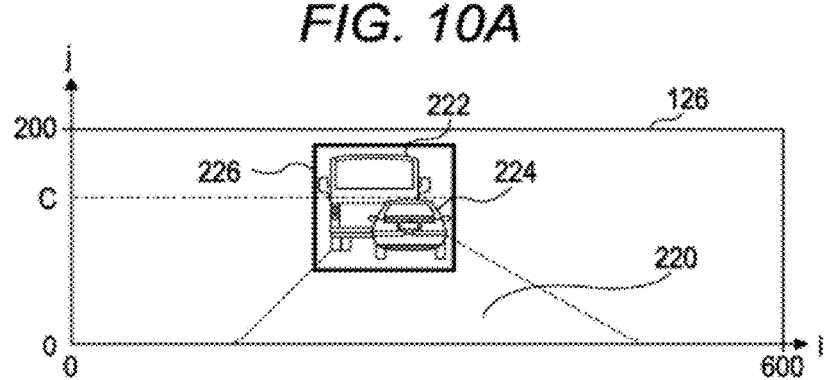
FIGS. 10A and 10B are explanatory diagrams for explaining the group dividing processing.
Figure 10B:
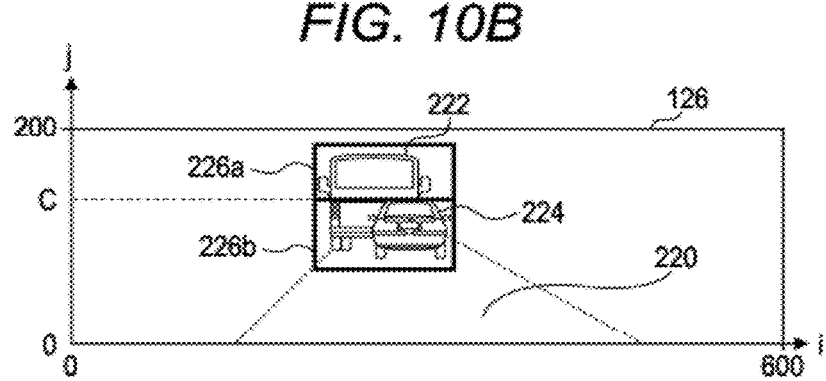

FIGS. 10A and 10B are explanatory diagrams for explaining the group dividing processing. When specifying the vertical position c, the group dividing unit 172 divides the target object 226 astride the vertical position c illustrated in FIG. 10A using the vertical position c as a boundary, whereby the target object 226 is divided into two new target objects 226a and 226b as illustrated in FIG. 10B.

In this manner, the group dividing unit 172 correctly divides the target object 226 including target portions that are supposed to be grouped as a different group but are undesirably grouped all together into different target objects 226a and 226b. Accordingly, the environment recognition apparatus 130 can enhance the accuracy of subsequent pattern matching processing.

The group dividing unit 172 determines the predetermined threshold value based on the average of the relative distances z of all target regions forming the target object 226.

As the relative distance in the depth direction z is larger, the distance resolution of the position derived by the position acquiring unit 160 is low. Therefore, the group dividing unit 172 adjusts the predetermined threshold value according to the relative distance in the depth direction z such that a value not larger than the distance resolution is neglected. With this configuration, the group dividing unit 172 can avoid the is situation in which the target object 226 is erroneously divided due to the influence of an error not larger than the distance resolution.

The pattern matching unit 174 performs pattern matching to model, data of a three-dimensional object preliminarily retained in the data retaining unit 152. The pattern matching unit 174 determines whether or not a target object corresponds to any three-dimensional object in this way, the environment recognition apparatus 130 can recognize not only a wall but also a three-dimensional object other than a wall.

(Environment Recognition Method)

Figure 11:
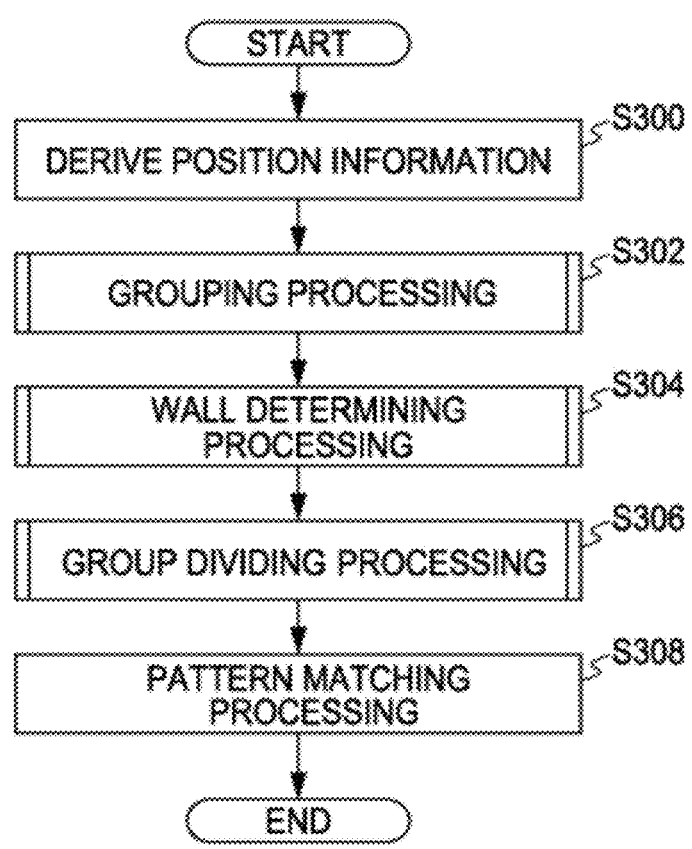
FIG. 11 is a flowchart illustrating an overall flow of an environment recognition method.
Figure 12:
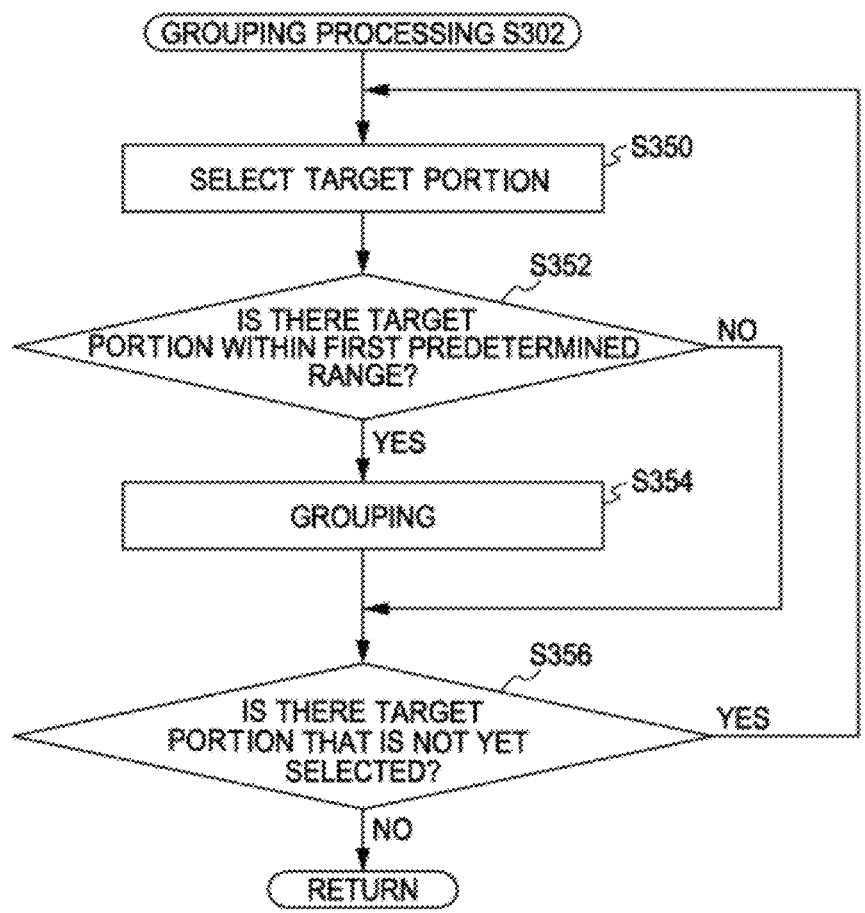
FIG. 12 is a flowchart illustrating a flow of grouping processing.
Figure 13:
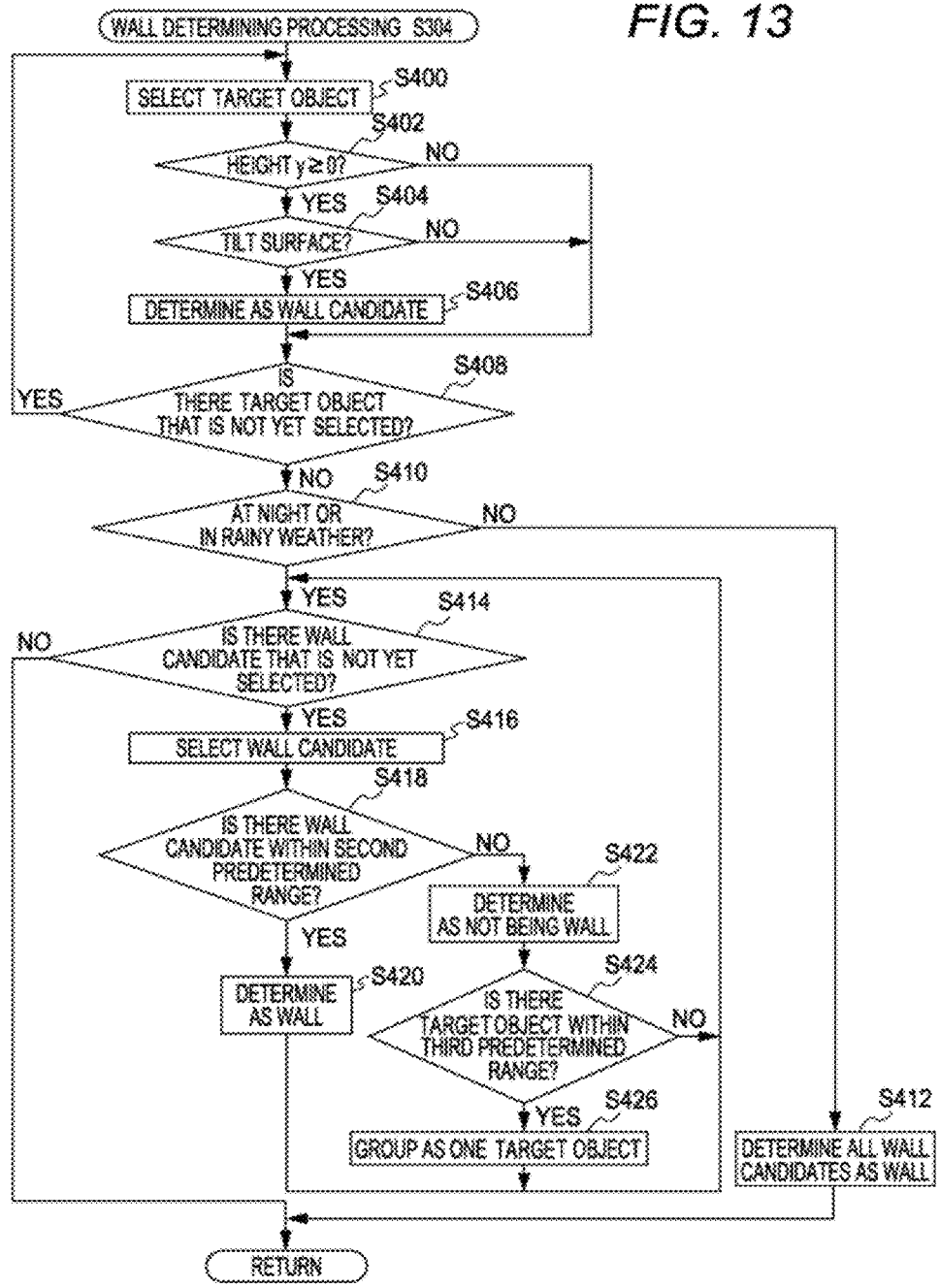
FIG. 13 is a flowchart illustrating a flow of wall determining processing.
Figure 14:
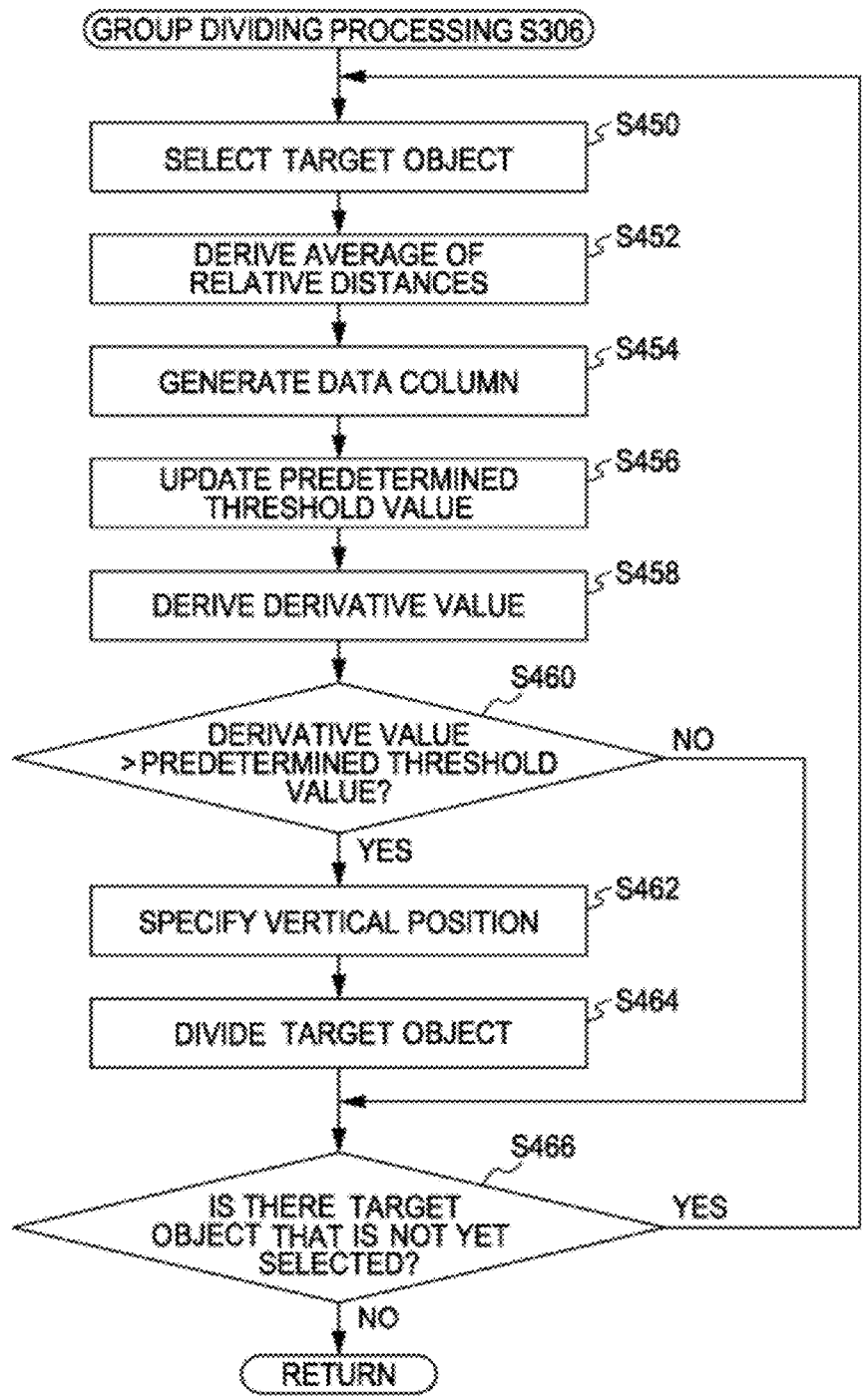
FIG. 14 is a flowchart illustrating a flow of group dividing processing.

Hereinafter, the particular processings performed by the environment recognition device 130 will be explained based on the flowchart shown in FIGS. 11 to 14. FIG. 11 illustrates an overall flow of interrupt processing when the image processing device 120 transmits the distance image (parallax information) 126. FIGS. 12 to 14 illustrate subroutines therein.

As illustrated in FIG. 11, when an interrupt occurs according to the environment recognition method in response to reception of the distance image 126, the position information indicating the position of each target portion in the real world is derived based on the parallax information for each block in the detection area 122 derived by the image processing device 120 (S300). The grouping processing is then performed on the target portions (S302).

Next, the wall determining processing is performed on a target object obtained by the grouping processing (S304), and the group dividing processing is performed on a target object that is not determined as a wall (S306). Then, the pattern matching unit 174 performs a pattern matching between the target object and a three-dimensional object for the target object (S308). Hereinafter, the above processings will be explained more specifically.

(Grouping Processing S302)

As shown in FIG. 12, the grouping unit 162 selects one target portion in the luminance image 124 that is not yet selected (S350). The grouping unit 162 determines whether or not there is a target portion of which position differences from the selected target portion in the width direction x and in the depth direction z fall within the first predetermined distance (S352). When there is a target portion within the first predetermined distance (YES in S352), the grouping unit 162 groups all target portions within the first predetermined distance into a target object (S354).

When all target portions within the first predetermined distance are already grouped into a target object, the target object is also used for grouping to form one target object. In this manner, the grouping unit 162 groups a plurality of closely continuous target portions into a target object.

When there is no target portion within the first predetermined distance (NO in S352), and after target object setting processing in S354, the grouping unit 162 determines whether or not there is a target portion that is not yet selected in the luminance image 124 (S356). When there is such target portion (YES in S356), the grouping unit 162 returns to the target object selecting processing in S350. When there is no target portion that not yet selected (NO in S356), the grouping processing S302 is terminated.

(Wall Determining Processing S304)

As shown in FIG. 13, the candidate determining unit 164 selects one target object that is not yet selected (S400). The candidate determining unit 164 determines whether or not the position in the height direction y of the center of the target object is 0 or more (is located above a road surface) (S402). When the position in the height direction y is less than 0 (NO in S402), the candidate determining unit 164 moves to step S408 that determines whether or not there is a target object that is not yet selected.

When the position in the height direction y is 0 or more (YES in S402), the candidate determining unit 164 determines whether or not the target portions grouped as a target object form a tilt surface tilting at a predetermined angle or more with respect to a plane vertical to the advancing direction of the subject vehicle 1 (S404). When they do not form the tilt surface (NO in S404), the candidate determining unit 164 moves to step S408 for determining whether or not there is a target object that is not yet selected.

When the target portions form a tilt surface (YES in S404), the candidate determining unit 164 determines that the target object formed by grouping the target portions is a wall candidate that is a candidate of a wall (S406). Then, the is candidate determining unit 164 moves to step S408 for determining whether or not there is a target object that is not yet selected.

Next, the candidate determining unit 164 determines whether or not there is a target object that is not yet selected (S408) When there is the target object that is not yet selected (YES in S408), the candidate determining unit 164 returns to the subject selecting processing in S400.

After the wall, candidate determining process is performed on all target objects (NO in S408), the environment determining unit 168 determines whether or not the detection area is in the environment where light is diffused, such as whether or not it is at night or in rainy weather (S410). When the detection region is not in the environment where light is diffused (NO in S410), the wall determining unit 166 determines all wall candidates are a wall (S412). When the detection area is in the environment where light is diffused (YES in S410), the wall determining unit 166 determines whether or not there are any wall candidates that are not yet selected (S414). When there is a wall candidate (YES in S414), the wall determining unit 166 selects one wall candidate that is not yet selected (S416) The wall determining unit 166 then determines whether or not there is another wall candidate within a range of a second predetermined distance in the X-axis direction and within a range of a second predetermined distance in the Z-axis direction around the central position of the selected wall candidate (S418).

The wall determining unit 166 also determines for the selected target object that is a wall candidate whether or not there is any other wall candidates located within a predetermined distance from an extended line linking the target portions grouped into a target object.

When there are other wall candidates located within a predetermined distance from the extended line linking the target portions (YES in S418), the wall determining unit 166 determines all of the wall candidates are a wall (S420). Then, the wall determining unit 166 returns to step S414 for determining whether or not there is a wall candidate that is not yet selected. Thus, the wall determining unit 166 determines these wall candidates which are closely continuous within the second predetermined distance as a wall.

When there is no other wall candidate (NO in S418), the wall determining unit 166 determines that the wall candidate is not a wall (S422). Then, the wall determining unit 166 determines whether or not there is another target object that is not the wall candidate within a third predetermined distance in the X-axis direction and in the Z-axis direction from the wall candidate which is determined not to be a wall (S424), When there is no target object other than the wall candidate (NO in S424), the wall determining unit 166 returns to step S414 for determining whether or not there is a wall candidate that is not yet selected.

When there is another target object other than the wall candidate (YES in S424), the wall determining unit 166 defines the wall candidate which is determined not to be a wall and the target object which is not the wail candidate all together as one target object (S426). Then, the wall determining unit 166 returns to step S414 for determining whether or not there is a wall candidate that is not yet selected.

When there is no wall candidate that is not yet selected in step S414 for determining whether or not there is a wall candidate that is not yet selected (NO in S414), the wall determining processing S304 is terminated.

(Group Dividing Processing S306)

As shown FIG. 14, the distance deriving unit 170 selects one target object that is not been selected in the group dividing processing in S306 (S450). Then, the distance deriving unit 170 derives an average of the relative distances in the depth direction z of target portions of the selected subject which are horizontally in line in the luminance image 124 (S452). The distance deriving unit 170 then generates a data column in which derived averages of the relative distances in the depth direction z are disposed based on the position in the vertical direction in the luminance image 124 (S454).

Next, the group dividing unit 172 derives the average of the relative distances in the depth direction z of all target portions forming the selected target object, and determines the predetermined threshold value based on the derived average (S456) The group dividing unit 172 derives a derivative value of the data column of generated averages of the relative distances in the depth direction z (S458), and determines whether or not the derived derivative value exceeds the predetermined threshold value (S460). When it does not exceed the predetermined threshold value (NO in S460), the flow moves to step S466 for determining whether or not there is another target object that is not yet selected.

When the derivative value exceeds the predetermined threshold value (YES in S460), the group dividing unit 172 specifies the vertical position c of target portions corresponding to the derivative value exceeding the predetermined threshold value (S462). The group dividing unit 172 divides the target object astride the vertical position c, using the vertical position c as a boundary (S464). Then, the flow moves to step S466 for determining whether or not there is another target object that is not yet selected.

Next, the distance deriving unit 170 determines whether or not there is a target object that is not yet selected in the group dividing processing in S306 (S466). When there is a target object that is not yet selected (YES in S466), the flow returns to the target object selecting processing in s450. When there is no target object that is not yet selected (NO in S466) the group dividing processing S306 is terminated.

As described above, the environment recognition device 130 can prevent an object that is not a wall from being erroneously determined to be a wall in an environment where light is easily e diffused, such as at night or in rainy weather.

A, program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference so the appended drawings, it is to be understood that the present invention is not limited to such embodiment. It will be apparent to those skilled in the art that various, changes may be made without departing from the scope of the invention.

In the above-mention embodiment, the grouping unit 162 and the wall determining unit 166 make a determination using the distance in the with direction x and the relative distance in the depth direction z in the real world, but a determination may be made using the detection distances in the luminance image 124 and the distance image 126. In this case, the first predetermined distance and the second predetermined distance are changed according to the relative distance of the target portion. As shown in FIG. 2 and the like, distant objects and close objects are represented in the flat plane in the Luminance image 124 and the distance image 126, and therefore, an object located at a distant position is represented in a small (short) size and an object located at a close position is represented in a large (long) size. Therefore, for example, the threshold values of the first predetermined distance and the second predetermined distance in the luminance image 124 and the distance image 126 are set as a small value for a distant target portion, and set at a large value for a close target portion. Therefore, even when the detection distances are different between a distant position and a close position, the grouping processing can be stably performed.

In addition to the difference in the width direction x and the difference in the depth direction z explained above, the grouping unit 166 may group target portions of which position difference in the height direction y is within the first predetermined distance. In this case, when any one of the difference of positions in the width direction x, the difference of positions in the height direction y, and the difference of positions (relative distances) in the depth direction z is greatly different, the group of the target portions may be deemed as an independent target object. In so doing, it is possible to perform highly accurate grouping processing.

Similarly, the wall determining unit 166 may make a determination of a wall based on not only the difference in the width direction x and the difference in the depth direction z but also the difference in the height direction y from the road surface. Considering the difference in the height direction y upon a determination of a wall can enhance the accuracy of detecting a wall by the wall determining unit 166.

In the above description, the grouping unit 162 independently determines each of the difference in the width direction x, the difference in the height direction y and the difference in the depth direction z is independently determined, and groups target portions into a same group only when all of them are included within the first predetermined distance, the target portions are grouped into a the same group. However, grouping processing may be performed using another calculation. For example, when a square mean value √ or the difference in the width direction x, the difference in the height direction y, and the difference in the depth direction z ((difference in the width distance x)2+(difference in the height direction v)2+ (difference in the depth direction z)2) is included within the first predetermined distance, target portions may be grouped into a same group. With such calculation, distances between target portions in the real world can be derived accurately, and therefore, grouping accuracy can be enhanced.

Similarly, the wall determining unit 166 independently determines each of the difference in the width direction x, the difference in the height direction y and the difference in the depth direction z is independently determined, and groups target portions into a same group only when all of them are included within the second predetermined distance, the target portions are grouped into a the same group. However, grouping processing may be performed using another calculation. For example, when a square mean value √ of the difference in the width direction x, the difference in the height direction y, and the difference in the depth direction z ((difference in the width distance x)2+(difference in the height direction y) 2+(difference in the depth direction z) 2) is included within the second predetermined distance, target portions may be is grouped into a same group. With such calculation, distances between target portions in the real world can be derived accurately, and therefore, grouping accuracy can be enhanced.

In the above embodiment, the three-dimensional position of the target object is derived based on the parallax between image data using the plurality of image capturing devices 110. However, the present invention is not limited to such case. Alternatively, for example, a variety of known distance measuring devices such as a laser radar distance measuring device may be used in this case, the laser radar distance measuring device emits laser beam to the detection area 122, receives light reflected when the laser beam is irradiated the object, and measures the distance to the object based on the time required for this event.

The above embodiment describes an example in which the position information obtaining unit 160 receives the distance image (parallax information) 126 from the image processing device 120, and generates the three-dimensional position information. However, the present invention is not limited to such case. The image processing device 120 may generate the three-dimensional position information in advance, and the position information obtaining unit 160 may obtain the generated three-dimensional position information. Such a functional distribution can reduce the processing load of the environment recognition device 130.

In the above embodiment, the position information acquiring unit 160, the grouping unit 162, the candidate determining unit 164, the wall determining unit 166, the environment determining unit 168, the distance deriving unit 170, the group dividing unit 172, and the pattern matching unit 174 are configured to be operated by the central control unit 154 with software. However, the functional units may be configured with hardware.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminances of the target object in a detection area.

The invention claimed is:

1. An environment recognition device comprising:
   a position information obtaining unit that obtains position information of a target portion in a detection area of a luminance image, including a relative distance from a subject vehicle;
   a grouping unit that groups target portions, of which positions differences in a vertical direction and a parallel direction with respect to a base line which corresponds to advancing direction of the subject vehicle fall within a first distance, into a target object;
   a candidate determining unit that determines that the target object is a candidate of a wall, when the target portions included in the target object form a tilt surface tilting at a predetermined angle or more against a vertical plane with respect to a base plane which corresponds to the advancing direction of the subject vehicle; and
   a wall determining unit that determines that the wall candidates, of which positions differences in the vertical direction and the parallel direction with respect to a base line which corresponds to the advancing direction of the subject vehicle fall within a second predetermined distance longer than the first predetermined distance, are a wall.

2. The environment recognition device according to claim 1, wherein the grouping unit makes a determination for the grouping based on not only the position differences in the vertical direction and the parallel direction with respect to a base line which corresponds to the advancing direction of the subject vehicle but also a position difference in the height direction from a road surface, and the wall determining unit may make a determination of a wall based on not only the position differences in the vertical direction and in the parallel direction with respect to a base line which corresponds to the advancing direction of the vehicle but also the position difference in the height direction from the road surface.

3. The environment recognition device according to claim 1, further comprising:
   an environment determining unit that determines whether or not the detection area is in an environment where light is diffused, wherein
   the wall determining unit determines all of the wall candidates as a wall when the environment determining unit determines that the detection area is in the environment where light is not diffused.

4. The environment recognition device according to claim 1, further comprising:
   a distance deriving unit that derives each average of in-line relative distances, which are assigned to target portions included in a target object and which are aligned in a horizontal direction of the image corresponding to the width direction in the real world; and
   a group dividing unit that divides the target object at a position where differences of the averages in the vertical direction of the image corresponding to the height direction in the real world exceeds the predetermined threshold value, and defines the position comprised of the horizontally aligned target portions as a boundary of the divided target objects.

5. The environment recognition device according to claim 4, wherein the group dividing unit determines the predetermined threshold value based on the average of the relative distances of all target portions included in the target object.

6. An environment recognition method comprising:
   obtaining position information of a target portion in a detection area of a luminance image including a relative distance from a subject vehicle;
   grouping target portions, of which positions differences in a vertical direction and a parallel direction with respect to a base line which corresponds to advancing direction of the subject vehicle fall within a first predetermined distance, into a target object;
   determining that the target object is a candidate of a wall, when the target portions included in the target object form a tilt surface tilting at a predetermined angle or more against a vertical plane with respect to a base plane which corresponds to the advancing direction of the subject vehicle; and determining that determines that the wall candidates, of which positions differences in the vertical direction and the parallel direction with respect to a base line which corresponds to the advancing direction of the subject vehicle fall within a second predetermined distance longer than the first predetermined distance, are a wall.

7. The environment recognition device according to claim 2, further comprising:
an environment determining unit that determines whether or not the detection area is in an environment where light is diffused, wherein
the wall determining unit determines all of the wall candidates as a wall when the environment determining unit determines that the detection area is in the environment where light is not diffused.

8. The environment recognition device according to claim 2, further comprising:
a distance deriving unit that derives each average of in-line relative distances, which are assigned to target portions included in a target object and which are aligned in a horizontal direction of the image corresponding to the width direction in the real world; and
a group dividing unit that divides the target object at a position where differences of the averages in the vertical direction of the image corresponding to the height direction in the real world exceeds the predetermined threshold value, and defines the position comprised of the horizontally aligned target portions as a boundary of the divided target objects.

9. The environment recognition device according to claim 3, further comprising:
a distance deriving unit that derives each average of in-line relative distances, which are assigned to target portions included in a target object and which are aligned in a horizontal direction of the image corresponding to the width direction in the real world; and
a group dividing unit that divides the target object at a position where differences of the averages in the vertical direction of the image corresponding to the height direction in the real world exceeds the predetermined threshold value, and defines the position comprised of the horizontally aligned target portions as a boundary of the divided target objects.

10. The environment recognition device according to claim 8, wherein the group dividing unit determines the predetermined threshold value based on the average of the relative distances of all target portions included in the target object.

11. The environment recognition device according to claim 9, wherein the group dividing unit determines the predetermined threshold value based on the average of the relative distances of all target portions included in the target object.

* * * * *